Figure 1:
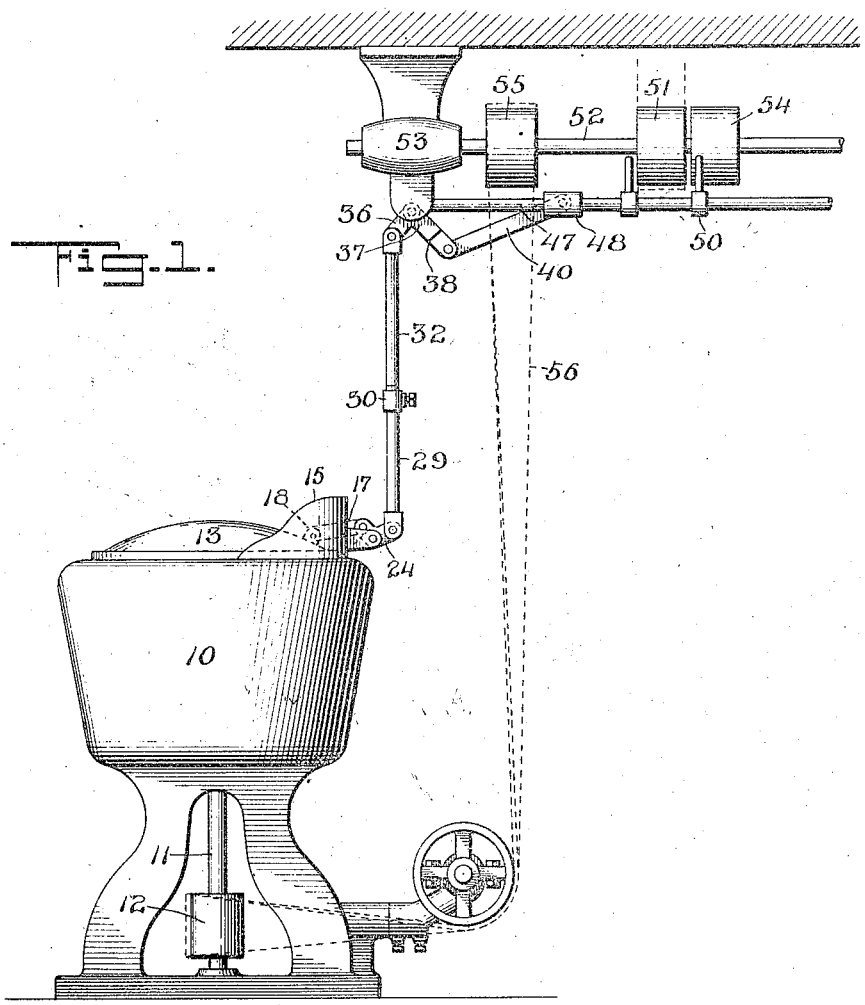

H. S. WILCOX & W. BARTHOLOMEW.
POWER CONTROLLER FOR MACHINES.
APPLICATION FILED SEPT. 17, 1909.

940,767.

Patented Nov. 23, 1909.
3 SHEETS—SHEET 1.

WITNESSES:
Wm F Doyle
Alfred T. Gage

INVENTORS
Henry S. Wilcox and
William Bartholomew,
BY
EB Stocking
Attorney

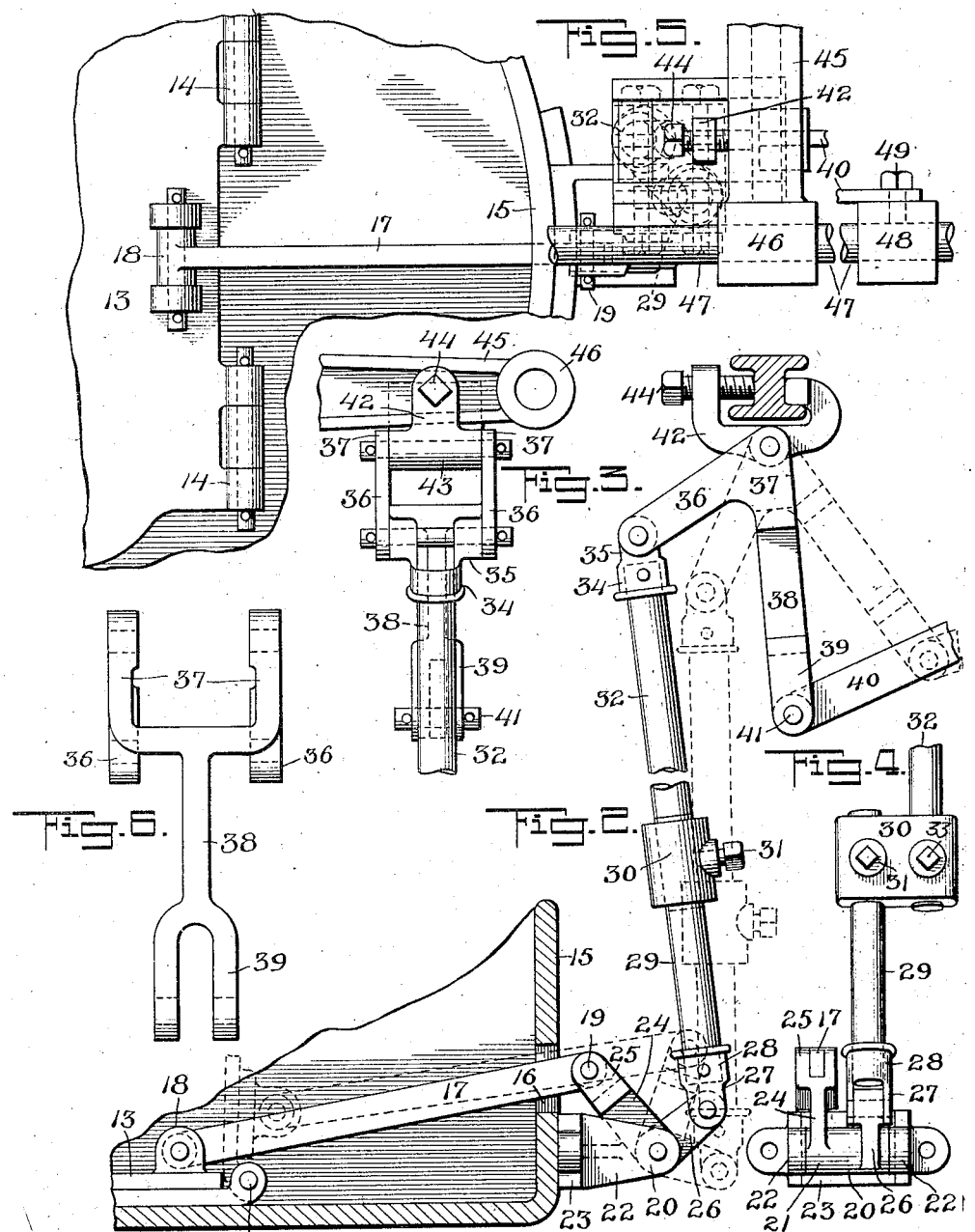

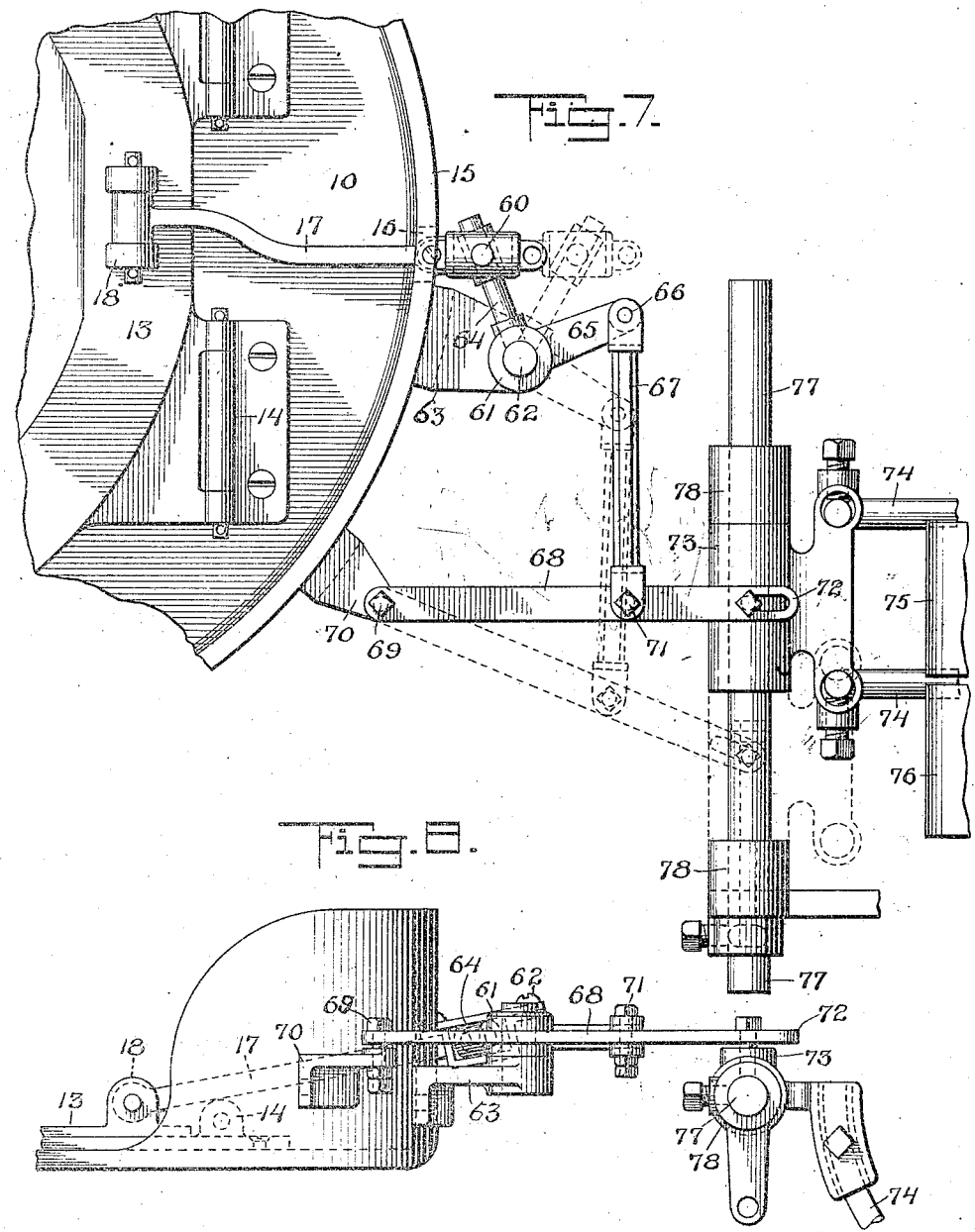

UNITED STATES PATENT OFFICE.

HENRY S. WILCOX AND WILLIAM BARTHOLOMEW, OF CHICAGO, ILLINOIS, ASSIGNORS TO TROY LAUNDRY MACHINERY COMPANY, OF CHICAGO, ILLINOIS, A CORPORATION OF NEW YORK.

POWER-CONTROLLER FOR MACHINES.

940,767.  Specification of Letters Patent.  Patented Nov. 23, 1909.

Application filed September 17, 1909. Serial No. 518,258.

*To all whom it may concern:*

Be it known that we, HENRY S. WILCOX and WILLIAM BARTHOLOMEW, citizens of the United States, residing at Chicago, county of Cook, State of Illinois, have invented certain new and useful Improvements in Power-Controllers for Machines, of which the following is a specification, reference being had therein to the accompanying drawing.

This invention relates to a power controller for machinery and particularly to a mechanism controlled in the movement of the cover of a centrifugal extractor or other machine for shifting the driving means therefor.

The invention has for an object to provide a novel and improved construction between a movable cover member and power controlling mechanism for a machine and comprises a bell-crank lever mounted upon the machine and connected with the cover by a pivoted link and also having a connecting rod extending to an actuating lever by which the power controlling mechanism is operated.

Another object of the invention is to provide an improved connection between the movable cover of a machine and an overhead driving shaft and comprises oppositely disposed crank levers connected together by a rod, one thereof having a link connection with the cover and the other a link connection with a power shifting device.

Other and further objects and advantages of the invention will be hereinafter set forth and the novel features thereof defined by the appended claims.

In the drawings—Figure 1 is an elevation showing the application of the invention to an extractor; Fig. 2 is a detail vertical section showing the connecting mechanism in elevation; Fig. 3 is a detail front elevation of the mounting for the actuating lever; Fig. 4 is a detail rear elevation of the bell-crank lever and connection therefrom; Fig. 5 is a detail top plan; Fig. 6 is a detail of the shifter lever; Fig. 7 is a top plan view of a modified form of the invention, and Fig. 8 is a side elevation thereof.

Like numerals of reference refer to like parts in the several figures of the drawings.

The numeral 10 indicates the casing of a centrifugal extractor of any desired construction, the revolving member of which is driven by the shaft 11 provided with a pulley 12 as indicated in Fig. 1. This casing is provided with a cover 13 pivotally mounted upon the top thereof at 14. The casing is also provided with a rear guard wall 15 having an opening or aperture 16 through which a connecting link 17 extends. This link is pivotally connected to the cover by means of lugs 18 and is at its opposite end pivoted to a crank lever 20 which may comprise a bell-crank as shown or any other form having arms disposed at an angle to each other. While the invention is particularly applicable to an extractor cover, which has been shown for the purpose of illustration, still it may be applied to a movable part of any other character of machine. The crank lever 20 may comprise the elongated hub 21 pivotally mounted between ears 22 extended from an attaching plate 23, these parts forming a supporting bracket therefor. The arm 24 of the lever is formed with a bifurcated end 25 to receive the end 19 of the link 17 while the oppositely disposed arm 26 of the lever is adapted to receive a socket 28 having pivoting ears 27. This socket receives the lower end of the connecting member which is here shown as adjustable and comprises the tube or rod 29 secured in the socket and provided at its upper end with an apertured block 30 adapted to be adjusted in position thereon by means of the set screw 31. This block also receives the upper member 32 of the connecting rod which is also adjustably secured by the set screw 33 as shown in Fig. 4. The upper end of the connector 32 is secured within the socket 34 which is provided with an elongated hub 35 disposed between and pivoted to the bifurcated arms 36 of the shifter lever 37. This lever is provided with an arm 38 disposed at an angle to the arm 36 thereof and provided with a bifurcated free end 39 between which the shifter link 40 is pivoted at 41.

As showing a desirable means for mounting the shifting lever 37 which comprises the actuating member for the power controlling means, we have illustrated in Figs. 2 and 3, a clamp 42 having an enlarged bearing 43 disposed between the arms 36 of the lever 37 and pivoted thereto. This clamp is provided with a set screw 44 by which it may be clamped in position upon any desired support for instance an I-beam 45 and adjusted thereon as desired. This beam is formed at its free end with a bearing 46 through which the shifter rod 47 slides. The shifter link 40 is connected with this rod by means of a collar 48 secured thereon and has a pivotal movement relative to said collar by its mounting upon the bolt 49 carried by the collar as shown in Fig. 5. The rod 47 is also provided with any desired construction of belt fingers 50 secured thereto as shown in Fig. 1 and coöperating with the tight pulley 51 carried by the shaft 52 mounted in any desired bearing such as shown at 53. This shaft also has the coöperating loose pulley 54 thereon and the transmitting pulley 55 secured thereto from which power is transmitted by the belt connection 56 to the driving pulley 12 upon the shaft of the machine.

In the modified form of the invention shown in Fig. 7 the cover 13 is mounted as before described and provided with the connecting link 17 extending therefrom through the aperture 16 in the wall 15. The link is pivotally connected at 60 with a bell-crank lever 61 having a vertically disposed pivot 62 on the bearing bracket 63. The lever is provided with arms 64 and 65 disposed at an angle to each other and the latter pivotally connected at 66 with a connecting rod 67 extending to the shifter lever 68 which is pivotally mounted at 69 upon a bracket 70. The connecting rod 67 is pivoted to this lever at 71. The outer end of the lever is slotted at 72 and there connected with the belt slide 73 which carries the shifting fingers 74 coöperating with the tight pulley 75 and loose pulley 76 similar to those heretofore described. The slide 73 is mounted upon a bearing 77 having stop blocks 78 to limit the travel of the slide.

In the operation of the invention when the cover is lifted or opened the driving means are shifted through the connections heretofore described so as to cut off the power from the machine in order that the operator may be protected against injury or damage to himself or the goods when having access to the interior of the machine through the opening at which the cover is disposed. When the cover is closed or lowered power is automatically applied for driving the machine. The construction here presented provides for a direct and positive transmission of movement from the cover through the rear wall to the shifting connections and the bell-crank lever pivoted to the cover link and to the shifter lever provides for the operation of the parts with a minimum of power necessary to secure the movement of the belt shifter and the extent of travel thereof. The extent of this travel may be adjusted by the connection between the bell-crank lever and shifter lever and this adjustment also permits the location of the machine at any desired elevation most convenient to the operator.

The invention also provides an improved construction for controlling the power from an over head driving shaft by means of the oppositely disposed bell-crank levers. It will therefore be seen that the invention presents a simple, efficient and economically constructed means for securing a positive movement of the belt shifter in either direction of movement of the cover and requires the minimum of power for that purpose.

Having described our invention and set forth its merits what we claim and desire to secure by Letters Patent is—

1. In a device of the class described, the combination with a power controlling mechanism, a movable cover member, a crank lever mounted adjacent said cover, a link pivoted to said cover and lever, a shifter lever connected to said power controlling mechanism, and a connection pivotally secured to said shifting and crank levers.

2. In a device of the class described, the combination with a power controlling mechanism, a movable cover member, a bell-crank lever mounted upon said device, a link pivoted to said cover and lever, a shifter lever, a sliding belt shifter having a connection pivoted to said shifter lever, and a rod connecting said shifter and bell-crank levers.

3. In a device of the class described, the combination with a power controlling mechanism, of a casing having an apertured wall at the rear of the top thereof, a movable cover member, a bell-crank lever disposed upon the casing at the rear of said wall, a link extending through said aperture and pivoted to the cover and crank, and a connection from said crank to the power controlling mechanism.

4. In a device of the class described, the combination with a power controlling mechanism, a movable cover member, a crank lever mounted adjacent said cover, a link pivoted to said cover and lever, a shifter lever connected to said power controlling mechanism, and an adjustable connection pivotally secured to said shifting and crank levers.

5. In a device of the class described, the combination with a power controlling mechanism, a movable cover member, a crank lever mounted adjacent said cover, a link pivoted to said cover and lever, a shifter lever connected to said power controlling mechanism, and adjustable rods pivotally secured to said shifting and crank levers.

6. In a device of the class described, the combination with a power controlling mechanism, a movable cover member, a crank lever mounted adjacent said cover, a link pivoted to said cover and lever, a shifter lever connected to said power controlling mechanism, a rod carried by said crank lever, a block adjustably secured to said rod, and a rod carried by said shifter lever and adjustably secured to said block.

7. In a device of the class described, the combination with an over head belt shifting device, of a movable cover member, a crank lever, a link pivoted to said cover and lever, a depending bell-crank shifter lever connected to said belt shifting device, and a vertically disposed connecting member pivotally secured to said shifter and crank levers.

8. In a device of the class described, the combination with an over head belt shifting device, of a movable cover member, a crank lever, a link pivoted to said cover and lever, a depending bell-crank shifter lever connected to said belt shifting device, a vertically disposed connecting member pivotally secured to said shifter and crank levers, and a supporting beam for said shifter lever having a bearing at its free end for a sliding member of said belt shifting device.

9. In a device of the class described, the combination with an over head belt shifting device, of a movable cover member, a crank lever, a link pivoted to said cover and lever, a depending bell-crank shifter lever connected to said belt shifting device, a vertically disposed connecting member pivotally secured to said shifter and crank levers, a supporting beam having a bearing at its free end for a sliding member of said belt shifting device, and a clamp adjustably mounted upon said beam and provided with a bearing for said shifter lever.

10. In a device of the class described, the combination with a power controlling mechanism, of a movable cover member, a crank lever mounted adjacent said cover, a link pivoted to said cover and lever, a bell-crank shifter lever, a connecting rod from one arm of said shifter lever to an arm of the first mentioned lever, and a shifting link extending from the opposite arm of said shifter lever to said power controlling mechanism.

11. In a device of the class described, the combination with a shaft provided with fast and loose pulleys thereon, of a parallel shifter rod provided with belt fingers to co-operate with said pulleys, a movable cover member, a crank lever mounted adjacent said cover, a link pivoted to said cover and lever, a bell-crank shifter lever, a connecting rod from one arm of said shifter lever to an arm of the first mentioned lever, and a link extending from the opposite arm of said shifter lever and pivotally connected to said shifter rod.

12. In a device of the class described, the combination with a power controlling mechanism, of a movable closure member, a supporting bracket having pivoting lugs, a crank lever provided with an elongated hub disposed between said lugs and oppositely extending arms one of which is bifurcated at its free end, a link pivoted to said bifurcated arm and closure, a shifter lever connected to said power controlling mechanism, and a connecting rod pivoted to said shifter lever and arm of the crank lever.

13. In a device of the class described, the combination with a power controlling mechanism, of a movable closure member, a supporting bracket having pivoting lugs, a crank lever provided with an elongated hub disposed between said lugs and oppositely extending arms one of which is bifurcated at its free end, a link pivoted to said bifurcated arm and closure, a shifter lever connected to said power controlling mechanism, and an adjustable connection having sockets at opposite ends pivoted to each of said levers.

14. In a device of the class described, the combination with a power controlling mechanism, of a movable closure member, a crank lever mounted adjacent to said closure, a link pivoted to said closure and lever, a connecting member extended from said lever, a shifter lever having bifurcated arms to embrace one end of said connecting member and an oppositely disposed arm having a bifurcated free end, an elongated support disposed between the bifurcated arms of said shifter lever, and a link pivoted at said free end of the shifter lever and connected to the power controlling mechanism.

In testimony whereof we affix our signatures in presence of two witnesses.

HENRY S. WILCOX.
WILLIAM BARTHOLOMEW.

Witnesses as to H. S. Wilcox:
  H. E. GEAR,
  F. W. BAILEY.
Witnesses as to W. Bartholomew:
  J. W. GRIFFEN,
  WM. KROGMAN.